(12) United States Patent
Tokui

(10) Patent No.: US 8,184,136 B2
(45) Date of Patent: May 22, 2012

(54) IMAGE DISPLAY DEVICE PROVIDED WITH MULTIPLE LIGHT SOURCES EMITTING DIFFERENT COLORS TO DISPLAY COLOR IMAGES IN COLOR SEQUENTIAL DISPLAY METHOD

(75) Inventor: Kei Tokui, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 500 days.

(21) Appl. No.: 12/376,214

(22) PCT Filed: Jul. 26, 2007

(86) PCT No.: PCT/JP2007/064650
§ 371 (c)(1),
(2), (4) Date: Feb. 3, 2009

(87) PCT Pub. No.: WO2008/015953
PCT Pub. Date: Feb. 7, 2008

(65) Prior Publication Data
US 2009/0322797 A1    Dec. 31, 2009

(30) Foreign Application Priority Data

Aug. 4, 2006   (JP) ................................ 2006-213133

(51) Int. Cl.
G09G 5/10 (2006.01)
G09G 3/34 (2006.01)
H04N 9/12 (2006.01)
H04N 5/64 (2006.01)
H04N 5/74 (2006.01)
G03B 21/00 (2006.01)

(52) U.S. Cl. ........ 345/691; 345/108; 348/742; 348/744; 348/771; 353/31

(58) Field of Classification Search .............. 345/31–32, 345/84–85, 108–111, 213, 690–691; 348/740–745, 348/750–751, 770–771; 353/31, 84–86
See application file for complete search history.

(56) References Cited

U.S. PATENT DOCUMENTS

| 5,233,385 A | 8/1993 | Sampsell |
| 2002/0063670 A1* | 5/2002 | Yoshinaga et al. .............. 345/87 |
| 2003/0227577 A1* | 12/2003 | Allen et al. .................... 348/742 |
| 2005/0073845 A1 | 4/2005 | Matsui |
| 2006/0279710 A1 | 12/2006 | Tani |

FOREIGN PATENT DOCUMENTS

| JP | 5-273673 A | 10/1993 |
| JP | 2002-229531 A | 8/2002 |
| JP | 2003-167297 A | 6/2003 |
| JP | 2004-184852 A | 7/2004 |
| JP | 2006-349731 A | 12/2006 |

* cited by examiner

Primary Examiner — Bipin Shalwala
Assistant Examiner — Keith Crawley
(74) Attorney, Agent, or Firm — Birch, Stewart, Kolasch & Birch, LLP

(57) ABSTRACT

An image display device is provided with multiple light sources 101, 102 and 103, and a display element 100. Control is performed on a period in which the display element 100 displays each color and on emission of the light sources 101, 102 and 103 respectively emitting light beams of different colors. A controller 107 is provided to switch a display method to a method more suitable for the type and others of a display image. Thus, the image display device, which performs a color sequential display, can select the display method suitable for the display image when the multiple light sources emitting light of different colors are used.

12 Claims, 6 Drawing Sheets

IMAGE DISPLAY DEVICE PROVIDED WITH MULTIPLE LIGHT SOURCES EMITTING DIFFERENT COLORS TO DISPLAY COLOR IMAGES IN COLOR SEQUENTIAL DISPLAY METHOD

BACKGROUND OF THE INVENTION

1. Field of Invention

The present invention relates to image display devices. More particularly, the invention relates to an image display device which is provided with multiple light sources emitting different colors to display color images in a color sequential display method.

2. Description of the Related Art

Conventionally, a color sequential display method of displaying primary color images in sequence, has been used as a method for displaying color images. In this method, when red, green and blue are used as primary colors, for example, a color image having red, green and blue as the primary colors can be displayed by separating a single color image into red, green and blue images and displaying the three color images in sequence. One of the examples of an image display device using such a display method is a projector with a DMD (Digital Micromilior Device) being an optical modulation element having a micro mirror array.

As a light source, a conventional projector often employs an extra-high pressure mercury lamp which emits only white light. However, since the DMD is an element for a time-division display, it is necessary to separate the white light into three primary colors: red, green and blue. A color wheel is typically used to separate light. A color wheel 200 shown in FIG. 6 has three dicbroic filters formed on a glass substrate, and thus has a red transmissive segment (R) 201, a green transmissive segment (G) 202 and a blue transmissive segment (B) 203 configured to transmit single-color light beams, that is, red, green and blue light beams, respectively. The white light can be temporally separated into the three colors by causing a motor to rotate the color wheel 200.

To improve the brightness of a color image displayed by the color sequential display method, the display period of a white image may be provided in addition to the display periods of the primary color images. In addition to the configuration of the color wheel 200 shown in FIG. 6, the color wheel shown in FIG. 7 has a white transmissive segment (W) 204, namely a clear segment, which transmits the white light. A brighter image can be obtained such as when a white image is displayed using such a color wheel. (For example, see Patent Document 1)

[Patent Document 1] JP-A 05-273673

SUMMARY OF THE INVENTION

Problems to be Solved by the Invention

However, to form the color wheel 205 shown in FIG. 7, the vertex angle of each of the sectoral transmissive segments—the red transmissive segment 201, the green transmissive segment 202 and the blue transmissive segment 203—needs to be reduced compared to those in the color wheel 200 shown in FIG. 6 in order to make room for the white transmissive segment 204. This means to reduce the display period (time rate) of each of red, green and blue images, and thus to reduce the respective brightness levels of red, green and blue colors. Being capable of improving the brightness of white, the method disclosed in Patent Document 1 suits for high-contrast images such as presentation documents. However, the method does not suit for fine-gradation images such as photographic images because the method improves the brightness of specific areas alone. This leads to a problem of deteriorating the gradation quality of the displayed image, and thus degrading the image.

Moreover, the method in Patent Document 1 is inappropriate as a method for displaying movies that typically require high image qualities in terms of colors and gradation as well, since the method reduces the brightness levels of the respective colors in displayed images, and thus deteriorates the gradation quality of the images.

An object of the present invention is to solve the above problems.

Means for Solving the Problems

The image display device according to the present invention includes a plurality of light sources emitting light beams of different colors, respectively, and a display element performing a color sequential display method. The device has a first display method and a second display method which are different from each other in light emission timings of the light sources and the periods in which the display element displays the respective single-color images.

In the image display device according to the present invention, the second display method displays more colors of the single-color images than the first display method, including all of the colors of the single-color images displayed by the first display method, and more than two of the light sources simultaneously emit light in at least one of the display periods for displaying the respective single-color images in the second display method.

In the image display device according to the present invention, when the display element displays, among the colors of the single-color images displayed in the second display method, a color having a shortest display period and being generated based on a single-color light beam emitted by one of the light sources, the light emission intensity of the light source in the first display method is higher than in the second display method.

The image display device according to the present invention includes a controller for controlling the light sources and the display element, and the controller switches between the first display method and the second display method in accordance with an image signal.

Effects of the Invention

According to the image display device of the present invention, the kinds of the single-color images displayed in the color sequential display method can be changed without having to replace a color separation means or to provide a physical movable component.

Further, the display method suitable for the display image can be selected through switching between a method for obtaining bright images by having a period in which multiple light sources emitting different colors emit light beams simultaneously and a method for obtaining images in which each color has the best brightness and gradation.

Furthermore, bright color images can be obtained by adjusting the light emission intensity of each light source according to the display method. Moreover, the best display method can be selected by switching the display method through control of the light sources and the display element based on the inputted image signal.

DESCRIPTION OF SYMBOLS

Figure 1:
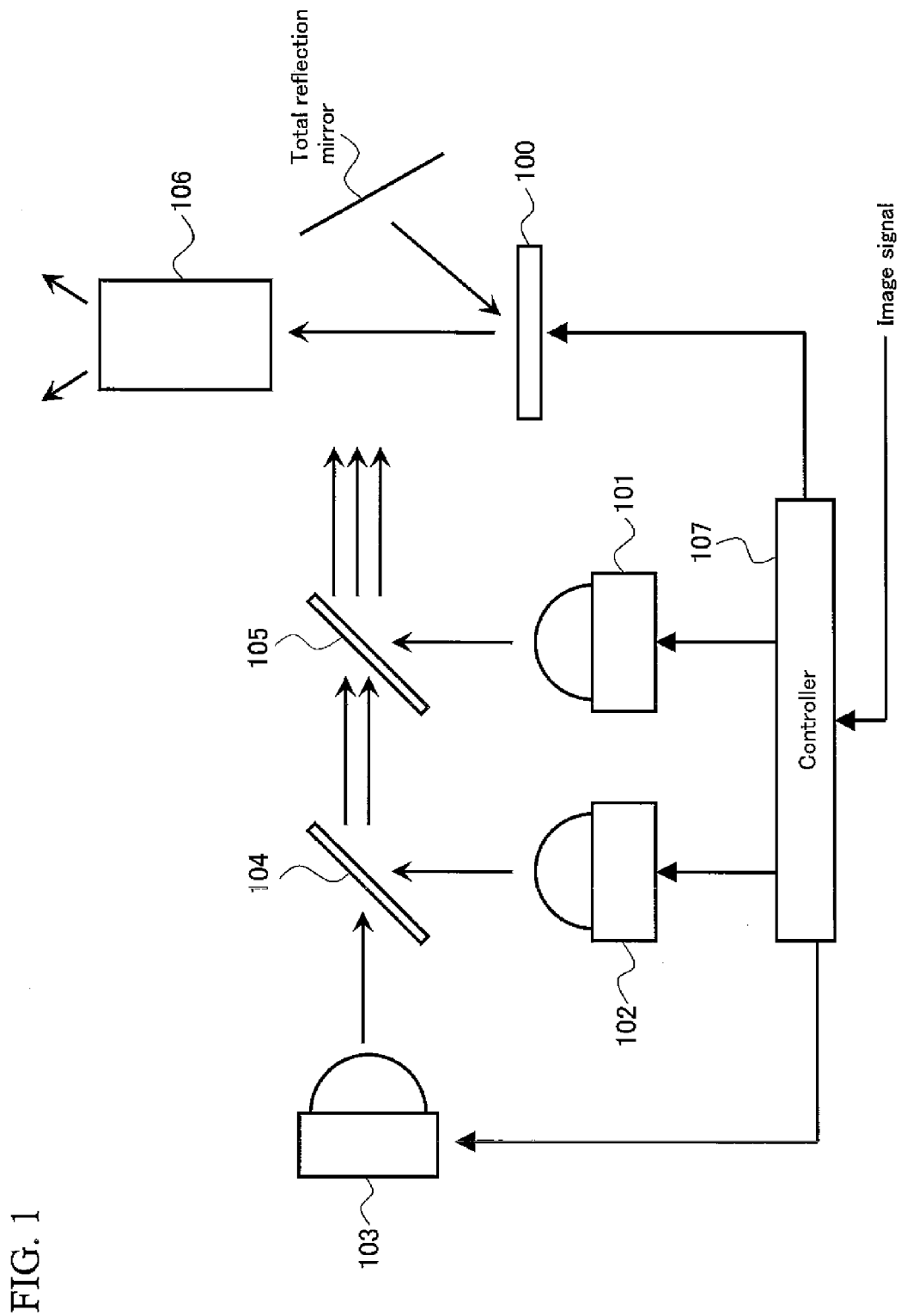
FIG. 1 is a configuration example of an image display device according to an embodiment of the present invention.

100 DMD
101 R-LED
102 G-RED
103 B-LED
104 Dichroic mirror
105 Dichroic mirror
106 Projection lens
107 Controller
200 Color wheel
201 Red transmissive segment
202 Green transmissive segment
203 Blue transmissive segment
204 White transmissive segment
205 Color wheel

DETAILED DESCRIPTION OF THE INVENTION

An embodiment of the present invention will be described with reference to the accompanying drawings. For ease of understanding of the characteristics of the present invention, the configuration of each drawing may not reflect the actual spacings and dimensions accurately.

FIG. 1 is a diagram showing a schematic configuration example of the image display device according to the embodiment of the present invention. As shown in FIG. 1, an image display element according to the embodiment includes a DMD (Digital Mirror Device) 100. Light sources are, for example, light emitting diodes (LEDs). An R-LED 101 for red light emission, a G-LED 102 for green light emission and a B-LED 103 for blue light emission are provided. The light beam emitted from each of the LEDs 101, 102 and 103 passes through or is reflected by a first dichroic mirror which transmits the blue light beam and reflects the green light beam, and a second dichroic mirror which transmits the blue and green light beams and reflects the red light.

For example, the first dichroic mirror 104 transmits the light beam emitted from LED 103 and reflects the light beam from LED 102. Both the transmitted light beam and the reflected light beam pass through the second dichroic mirror 105. The second dichroic mirror 105 reflects the light beam from LED 101, as a result, all the transmitted light beams and reflected light beams are incident on the DMD 110. In this way, by the reflection of a total reflection mirror, for example, the DMD 100 can be irradiated with the light beams emitted from the LEDs 101, 102 and 103 and synthesized. The DMD 100 modulates the light in accordance with an image information signal inputted from a controller 107, and the modulated light is enlarged and displayed by a projection lens 106.

Although not shown in FIG. 1, optical members known in the art, such as illumination lens and rod integrator, can be appropriately arranged on the light paths according to purposes. The controller 107 controls the emissions of the LEDs 101, 102 and 103, and the display of the DMD 100, and may be configured of a LED driver, a DMD driver, a microcomputer and others, which are not shown.

Figure 2:
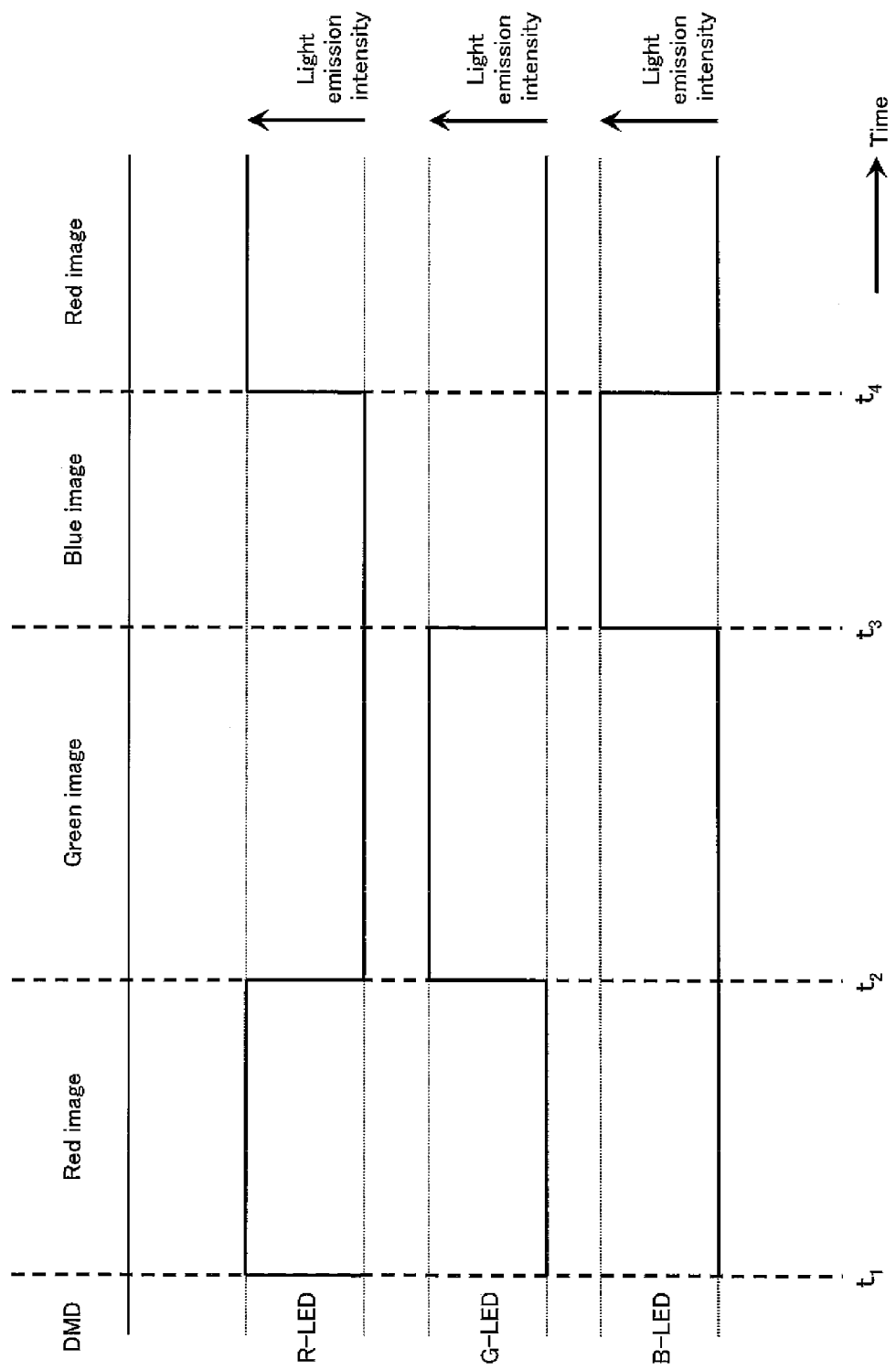
FIG. 2 is a timing chart showing an example of a display period of each color image and the emission timing of each LED.
Figure 3:
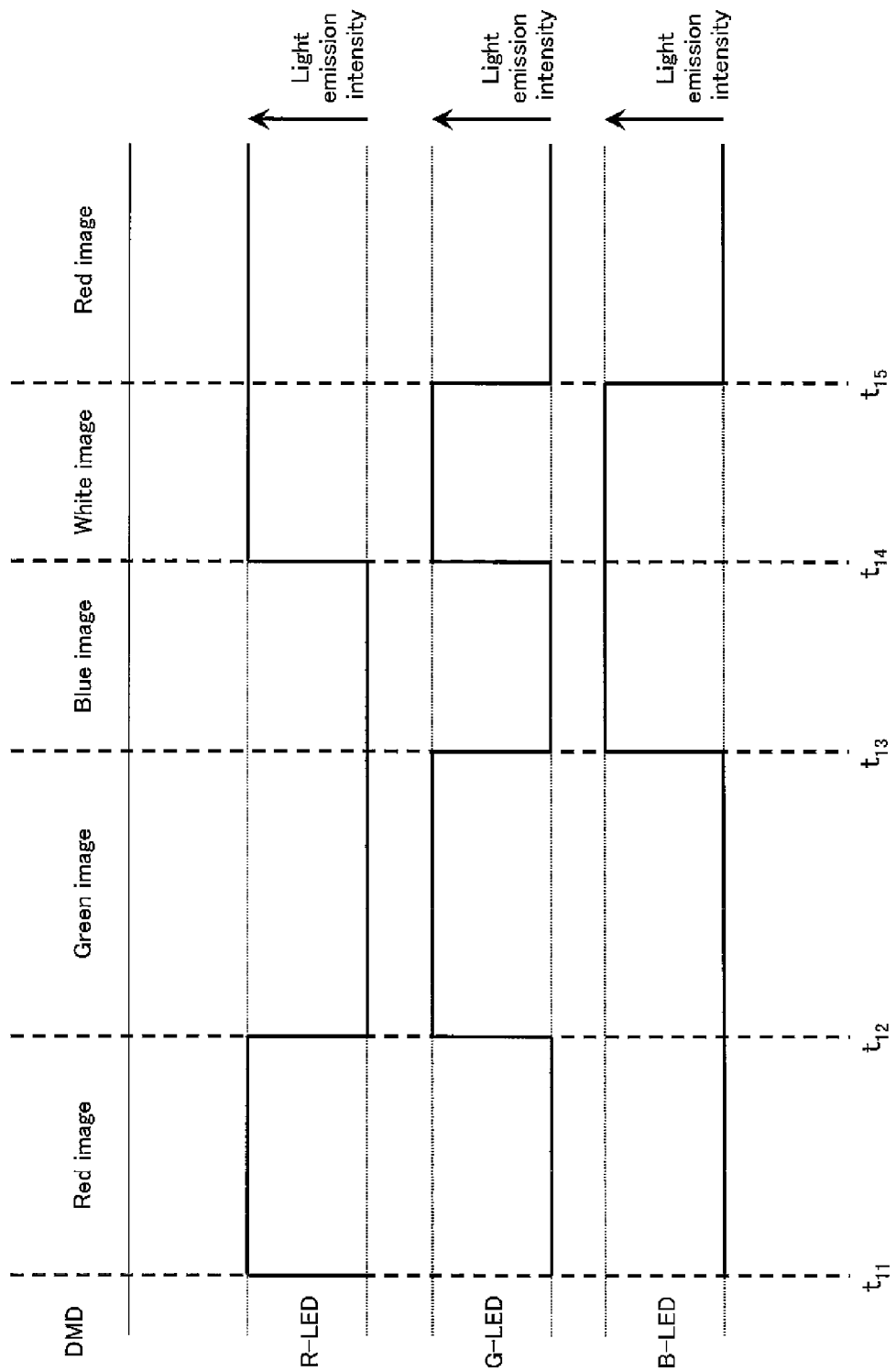
FIG. 3 is a timing chart showing another example of the display period of each color image and the emission timing of each LED.

FIG. 2 and FIG. 3 are timing charts showing the relation between the emission state of each LED and the display state of the DMD along a time axis. In these charts, the horizontal axis shows time, and the vertical axis shows the light emission intensity of each LED. FIG. 2 shows an example of color display which the DMD 100 performs using red, green and blue images. As shown in FIG. 2, in the period (t1 to t2) when the DMD 100 is displaying the red image for the red component of color image, only the R-LED 101 emits light and the G-LED 102 and the B-LED 103 do not emit light. In the period (t2 to t3) when the DMD 100 is displaying the green image for the green component of color image, only the G-LED 102 emits light, and the R-LED 101 and the B-LED 103 do not emit light. Furthermore, in the period (t3 to t4) when the DMD 100 is displaying the blue image for the blue component of color image, only the B-LED 103 emits light, and the R-LED 101 and the G-LED 102 do not emit light. In this manner, the light emission period of each LED is separated by time.

FIG. 3 is a timing chart showing an example where the DMD performs a display using the red, green, blue and white images. In the period (t11 to t12) when the DMD 100 is displaying the red image for the red component of color image, only the R-LED 101 emits light, and the G-LED 102 and the B-LED 103 do not emit light. In the period (t12 to t13) when the DMD 100 is displaying the green image for the green component of color image, only the G-LED 102 emit light, and the R-LED 101 and the B-LED 103 do not emit light. In the period (t13 to t14) when the DMD 100 is displaying the blue image for the blue component of color image, only the B-LED 103 emit light, and the R-LED 101 and the G-LED 102 do not emit light. In the period (t14 to t15) when the DMD 100 is displaying the white image for the white component of color image, all the R-LED 101, the G-LED 102 and the B-LED 103 emit light to generate the white image.

One characteristic of the image display device according to this embodiment is the capability of switching between the RGB display control shown in FIG. 2 and the RGBW display control shown in FIG. 3 by means of the controller 107. Such a configuration of selecting (switching) the display between the one using red, green and blue and the one using red, green, blue and white makes it possible to perform the display suitable to the type of inputted image. For this purpose, the controller switches the type and timing of display color of the DMD and controls the emission timing and intensity of each LED.

When, for example, the image display device is configured by applying a color wheel to the method shown in FIG. 2 to perform the color separation by means of the color wheel as explained in the section DESCRIPTION OF THE RELATED ART, such configuration is fixed. Thereby, it is difficult to switch to the method shown in FIG. 3. On the other hand, when the image display device is configured by the method shown in FIG. 3, switching to the display method using red, green and blue is possible; however, no display is performed in the period for the white display, and consequently the displayed image darkens.

As one alternative, the color wheel may be switched as the display method is switched between the one shown in FIG. 2 and the one in FIG. 3. From a practical viewpoint however, the need of two types of color wheels will increase the cost. Furthermore, the need for large movable mechanism and wide movable space will make the image display device large.

In contrast, since the image display device of the embodiment, as shown in FIG. 1, has multiple light sources each emitting a different color, switching among multiple display methods can be accomplished by controlling the display of the DMD and the emission of each LED without using such a color separation means as the color wheel, which is a significant characteristic. For example, for presentations, it is desirable to use the display method shown in FIG. 3 because the brightness of white image is more important than the brightness and gradation of the other color images. For movies, on the other hand, it is desirable to use the display method of FIG. 2 because the brightness and gradation of each color image are important.

Switching between the method in FIG. 2 and that in FIG. 3 is described in detail. When switching from the display method shown in FIG. 3 using red, green, blue and white to the display method shown in FIG. 2 using red, green and blue, the time used for displaying the white image in FIG. 3 is divided into three in accordance with the rate of display time for red, green and blue images of FIG. 3, and then allocated to the time for displaying each of red, green and blue images in FIG. 2. This time allocation enables the white point to be maintained without changing the light emission intensity of each LED. As a result, there is no need to have a micro computer or the like store the light emission intensity of each LED identified according to the display methods, the configuration of image display device can be simplified.

The luminous efficiency of each LED varies depending on the color emitted, and therefore, the display period is configured to differ according to the color emitted. The display period of the DMD is temporally limited due to gradation expressing by micro mirrors. In order to obtain the brightest image, it is preferred to set the display period of each color so that the white point becomes a desired value with each LED having the maximum light emission intensity. However, when the configuration, in which the display period of green image is extended and that of blue image is shortened, cannot be set due to the temporal limitation, it is necessary to change the white point by adjusting the light emission intensity of each LED.

Figure 4:
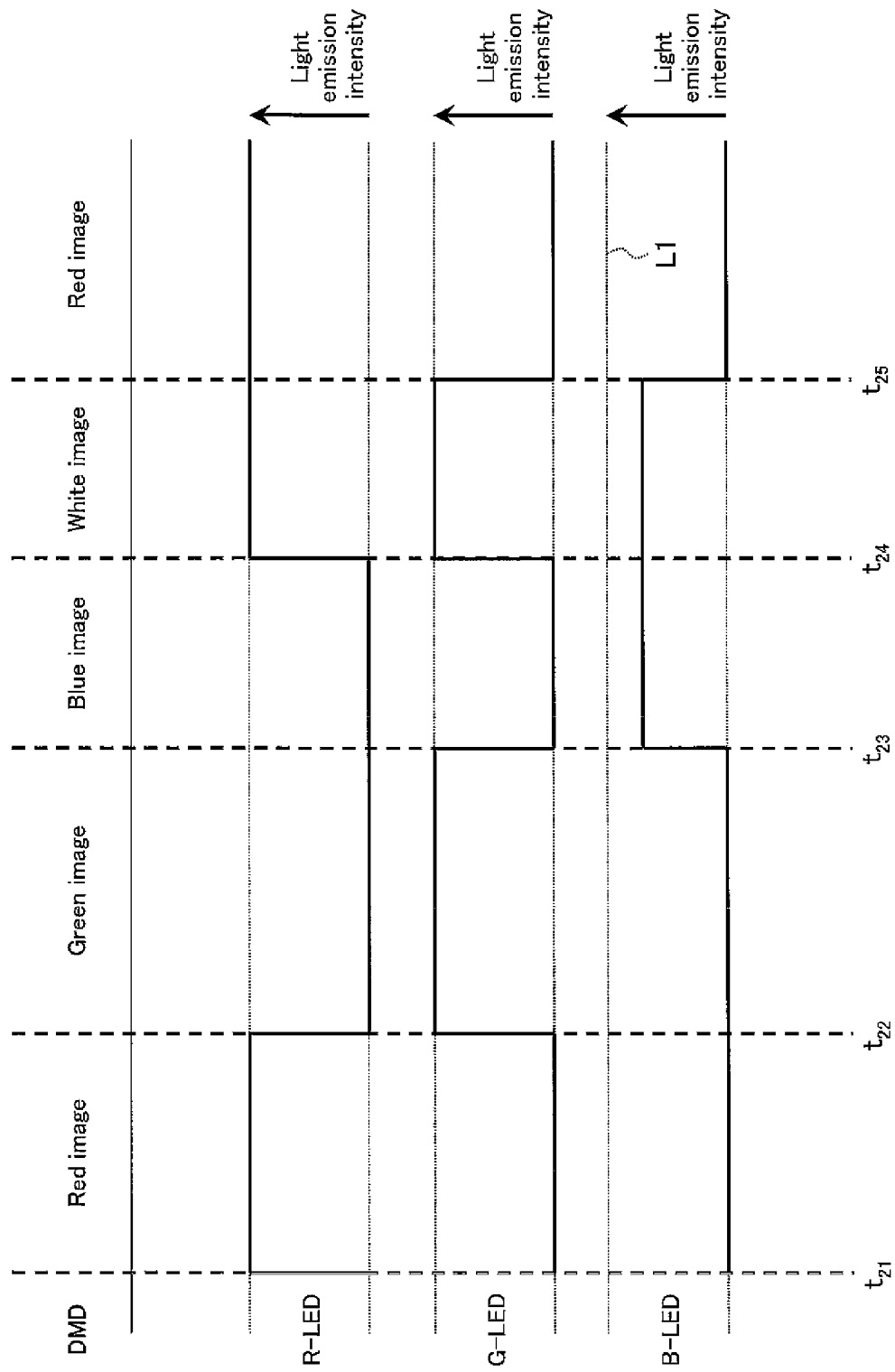
FIG. 4 is a timing chart showing another example of the display period of each color image and the emission timing of each LED.

For example, according to the display method using red, green, blue and white, if the light emission intensity of the B-LED is lower than the maximum level shown by the dotted line due to the temporal limitation, the result is as shown in FIG. 4. In other words, because of the temporal limitation in which the display period of blue image (t23 to t24) cannot be shorter than the period shown in FIG. 4, the light emission intensity of the B-LED is set lower than the maximum level.

Figure 5:
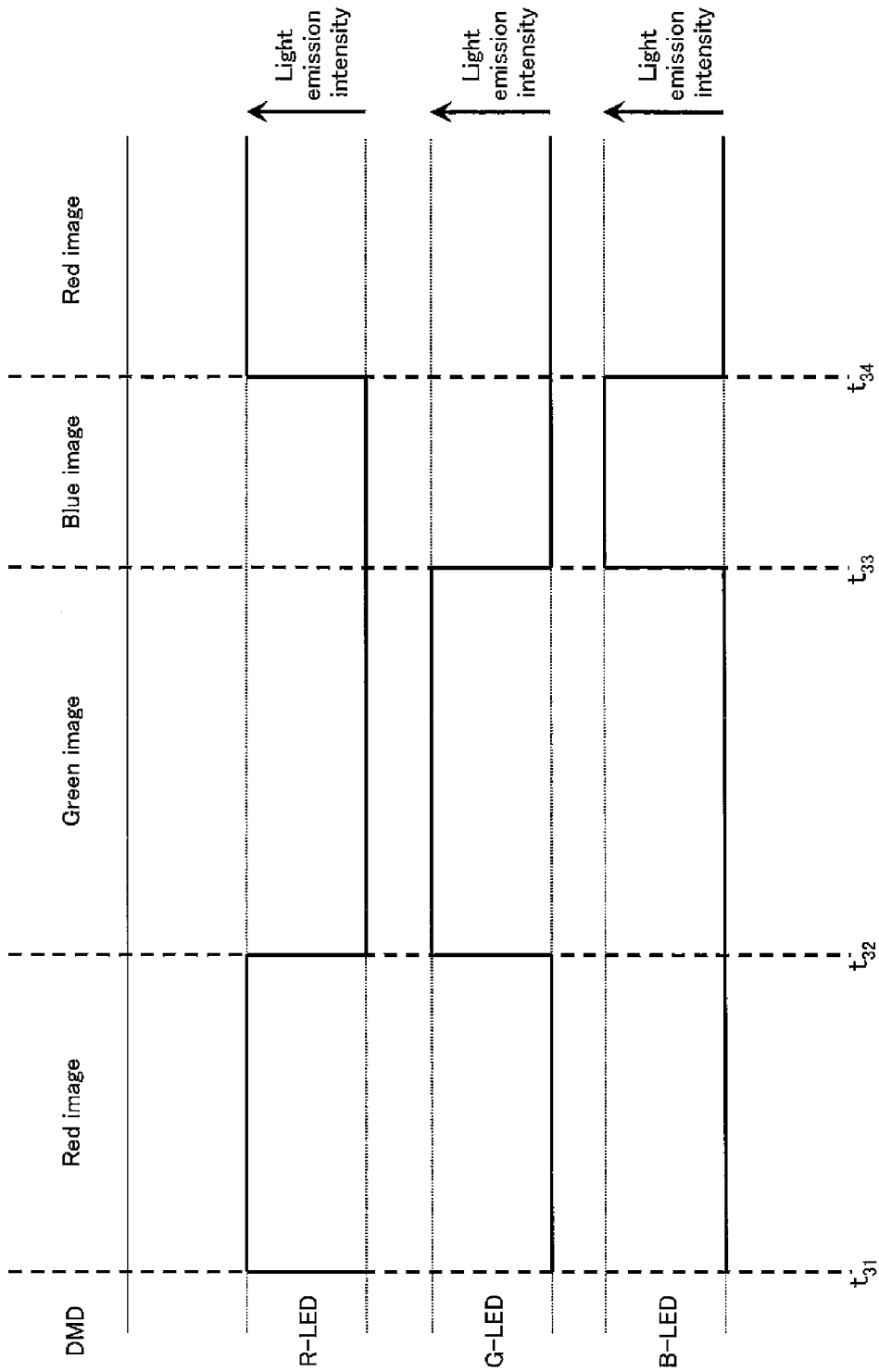
FIG. 5 is a timing chart showing another example of the display period of each color image and the emission timing of each LED.
Figure 6:
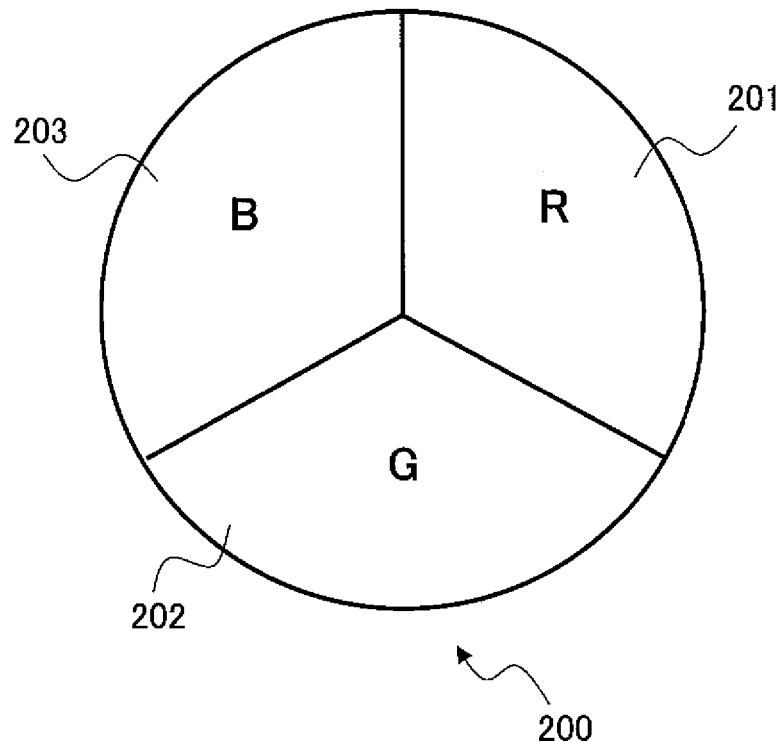
FIG. 6 is a schematic configuration example of a conventional color wheel.
Figure 7:
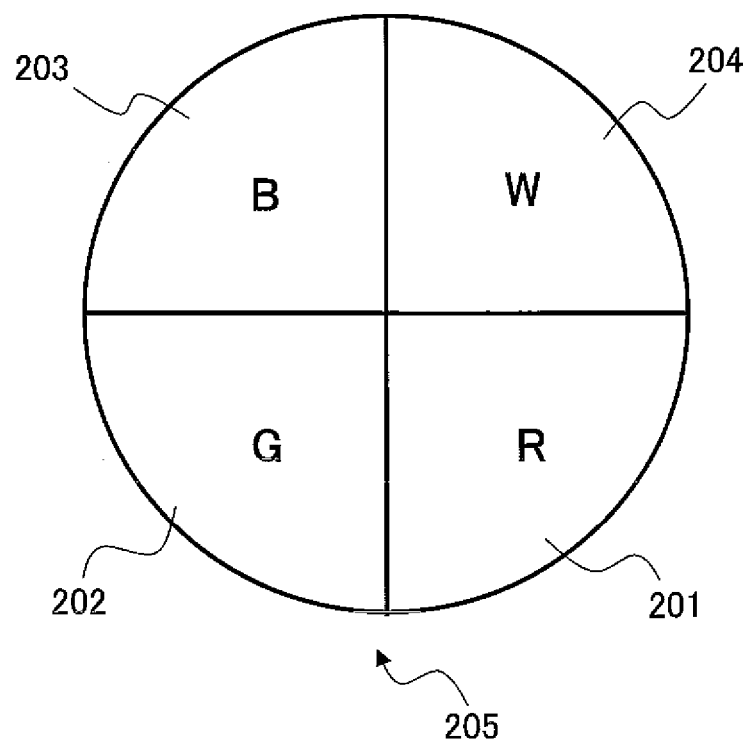
FIG. 7 is a schematic configuration example of another conventional color wheel

To switch the display method to the one using red, green and blue from the one shown in FIG. 4, the manner shown in FIG. 5 may be used. In FIG. 5, the display period of blue image (t33 to t34) is set to the same length as shown in FIG. 4, and the display periods of red and green images (t31 to t32 and t32 to t33) are set longer than those in FIG. 4 (t21 to t22 and t22 to t23). In FIG. 5, the light emission intensities of the red LED and the green LED are set to the same level as in FIG. 4, but the intensity of the blue LED is increased up to the level shown by the dotted line. Increasing the intensity of blue light in this way can make the image brighter. Therefore, the method explained so far can obtain bright images more efficiently than allocating the white image display period according to the rate of display period for red, green and blue images.

In the illustration of the embodiment, the light emission intensity of the R-LED, the G-LED and the B-LED in the white image display period is the same as that in the display period of each of red, green and blue images. However, the light emission intensity of each LED can be set at any value to obtain a desired white point. That is, even when each LED has a different light intensity value, the present invention can be applied.

Although description has been given of the display method using red, green and blue, and the display method using red, green, blue and white, another display method using red, green, blue and yellow can also be used by, for example, turning on the red and green LEDs simultaneously to generate yellow. The technique according to the embodiment can also be applied to the multi-primary color display in which light sources emitting such colors as cyan and amber are used in addition to red, green and blue LEDs.

For example, for movies, the display method is switched so that the light sources and displays for red and amber are controlled for the multi-primary color display. For presentations, the method is switched so that the light sources for red and amber are turned on simultaneously to perform a display correspondingly.

It is further preferable to switch the display method according to the type of inputted image signal. When the signal is inputted from a personal computer, the display method suitable for presentations is selected, and when the signal is inputted from a DVD player, the display method suitable for movies is selected.

For example, when an image signal is inputted to the image display device through a DVI terminal or a D-sub terminal, the image display device can recognize it as the input from a personal computer. When the signal is inputted through an S terminal or a D terminal, the device can recognize it as the input from a DVD player. In this way, the display method can easily be switched according to the inputted image signal.

Such an input-type-dependent control has an advantage of being capable of performing the image display processing by means of the best method in terms of brightness and gradation simply by inputting an image signal to the image display device. It is also possible to store multiple display control methods suitable for each image type into the memory of image display device and to switch between the methods in accordance with the external input signal (e.g., the setting signal from a remote control unit) so that the image viewer can easily select the best display mode between cinema, presentation and game modes. A detection part for detecting the type of image may be provided. The image type can be detected from, for example, the type information, title and others of the input image.

The embodiment has described the exemplary image display device employing the DMD as a display element; however, the display control technique according to this embodiment can also be applied to such display elements as for the liquid crystal display panel and LCOS (Liquid Crystal On Silicon) which display images in the color sequential display method. The embodiment has described the exemplary image display device employing the LEDs as light sources; however, the light sources emitting specific colors such as laser light sources can also be used. A preferable way to control the light quantity of each color is to control the current input to the DMD. In addition, the light emission period control can also be useful for the transmission type liquid crystal display and LCOS.

As explained above, the image display device which can generate efficient and bright images by controlling the display period of each color of the display element and the emission timing of each light source can be provided.

Industrial Applicability

The present invention can be used for image display devices.

The invention claimed is:

1. An image display device, comprising
a plurality of light sources emitting light beams of different colors, respectively, and
a display element performing a color display by a color sequential display method, based on the light beams from the plurality of light sources, wherein
the display element comprises a plurality of micro mirrors that control the reflection of light and temporally perform gradation expression, and
the image display device has a controller controlling a light emission intensity, a light emission timing of each of the light sources and a period in which the display element displays each color, characterized in that
the controller is configured to switch between a first display method and a second display method which are different from each other in light emission intensities and/or light emission timings of the light sources and the periods in which the display element displays each color,
the second display method displays more colors of single-color images than the first display method, and more than two of the light sources emit light in at least one of the display periods for displaying the respective single-color images in the second display method,
in the first display method, setting the respective display periods of each color so that a white color point becomes a predetermined value when the light emission intensities for each color are at a maximum, and;
in the second display method, the display period for one of the single color images is set to a time limit while the display periods of at least one of the other single color images is different than the time limit and the emission intensity of the particular color is set smaller than said maximum light emission so that the white point becomes said predetermined value.

2. The image display device according to claim 1, wherein the first display method and the second display method are different in colors of the single-color images displayed by the display element.

3. The image display device according to claim 1, wherein the controller switches between the first display method and the second display method in accordance with an image signal.

4. The image display device according to claim 1, wherein the controller switches between the first display method and the second display method in accordance with an image type.

5. The image display device according to claim 4, further comprising an image type detection part detecting the image type.

6. The image display device according to claim 1, wherein the controller performs control so that a display method suitable in terms of brightness and gradation are selected from the first display method and the second display method.

7. The image display device according to claim 1, wherein the controller includes an operation part used for switching between the first display method and the second display method.

8. The image display device according to claim 1, wherein the controller can switch between the first display method without a white image display period and the second display method with the white image display period.

9. The image display device according to claim 8, wherein:
the second display method is selected to emphasize brightness of white over brightness and gradation of each color, and
the first display method is selected to emphasize the brightness and gradation of each color over the brightness of white.

10. The image display device according to any one of claims 8 and 9, wherein the controller switches between the first display method and the second display method in accordance with a type of an image signal.

11. The image display device according to claim 10, wherein the type of the image signal is identified based on an image signal input terminal into which the image signal is inputted.

12. The image display device according to claim 8, wherein:
a plurality of display control methods each suitable for a different image type, are stored in a memory in the image display device, and
the image display device switches among the display control methods in accordance with an external input signal.

* * * * *